(12) United States Patent
Fallisgaard et al.

(10) Patent No.: US 11,956,387 B2
(45) Date of Patent: Apr. 9, 2024

(54) COMMUNICATION ROUTER AND HUB

(71) Applicant: Better Holdco, Inc., New York, NY (US)

(72) Inventors: James Fallisgaard, Brooklyn, NY (US); Amy Yue Zhou, Brooklyn, NY (US)

(73) Assignee: Better Holdco, Inc., New York, NY (US)

( * ) Notice: Subject to any disclaimer, the term of this patent is extended or adjusted under 35 U.S.C. 154(b) by 74 days.

(21) Appl. No.: 17/667,140

(22) Filed: Feb. 8, 2022

(65) Prior Publication Data
US 2022/0256035 A1 Aug. 11, 2022

Related U.S. Application Data

(60) Provisional application No. 63/146,909, filed on Feb. 8, 2021.

(51) Int. Cl.
*H04M 3/523* (2006.01)
*H04M 3/42* (2006.01)
*H04M 3/51* (2006.01)

(52) U.S. Cl.
CPC ......... *H04M 3/523* (2013.01); *H04M 3/5133* (2013.01)

(58) Field of Classification Search
CPC ............... H04M 3/523; H04M 3/5133; H04M 2203/408; H04M 2203/551; H04M 3/42068

USPC ............ 379/265.12, 265.11, 265.05, 265.01, 379/266.1

See application file for complete search history.

(56) References Cited

U.S. PATENT DOCUMENTS

| | | | | |
|---|---|---|---|---|
| 6,731,744 | B1 * | 5/2004 | Khuc | H04M 3/5183 |
| | | | | 379/265.09 |
| 9,742,916 | B1 * | 8/2017 | Christopher | H04M 3/5158 |
| 11,509,711 | B2 * | 11/2022 | Frink | G06F 12/023 |
| 2010/0254527 | A1 * | 10/2010 | Addair | H04M 3/5233 |
| | | | | 379/265.12 |

\* cited by examiner

*Primary Examiner* — Thjuan K Addy

(57) ABSTRACT

A communication router and hub are provided. In examples, a communication platform enables communication between a customer and a service. Customer information associated with a customer is stored as part of a customer record. The customer record may be associated with the customer using a customer address (e.g., a telephone number or an email address) and/or a communication address associated with the service. Thus, in response to a subsequent communication, the communication platform may identify the customer record based at least in part on the customer address and the service communication address, thereby enabling improved communication routing for incoming and outgoing communications associated with the customer. Additionally, customer information from the customer record may be presented to an experience agent of the service, such that the experience agent is able to better assist the customer.

20 Claims, 7 Drawing Sheets

COMMUNICATION ROUTER AND HUB

CROSS-REFERENCE TO RELATED APPLICATION

This application claims priority to U.S. Provisional Application No. 63/146,909, titled "Communication Router and Hub," filed on Feb. 8, 2021, the entire disclosure of which is hereby incorporated by reference in its entirety.

BACKGROUND

A communication platform may provide communication functionality for a variety of services and associated customers. However, managing and effectively using customer information to route communications and provide context associated with a customer may be challenging. Additionally, it may be difficult to manage communications between a service and a customer, especially in instances where multiple services use the communication platform to communicate with the same customer.

It is with respect to these and other general considerations that embodiments have been described. Also, although relatively specific problems have been discussed, it should be understood that the embodiments should not be limited to solving the specific problems identified in the background.

SUMMARY

Aspects of the present disclosure relate to a communication router and hub. In examples, a communication platform enables communication between a customer and a service. Customer information associated with a customer is stored as part of a customer record. The customer record may be associated with the customer using a customer address (e.g., a telephone number or an email address) and/or a communication address associated with the service. Thus, in response to a subsequent communication, the communication platform may identify the customer record based at least in part on the customer address and the service communication address, thereby enabling improved communication routing for incoming and outgoing communications associated with the customer. Additionally, customer information from the customer record may be presented to an experience agent of the service, such that the experience agent is able to better assist the customer.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

Figure 1:
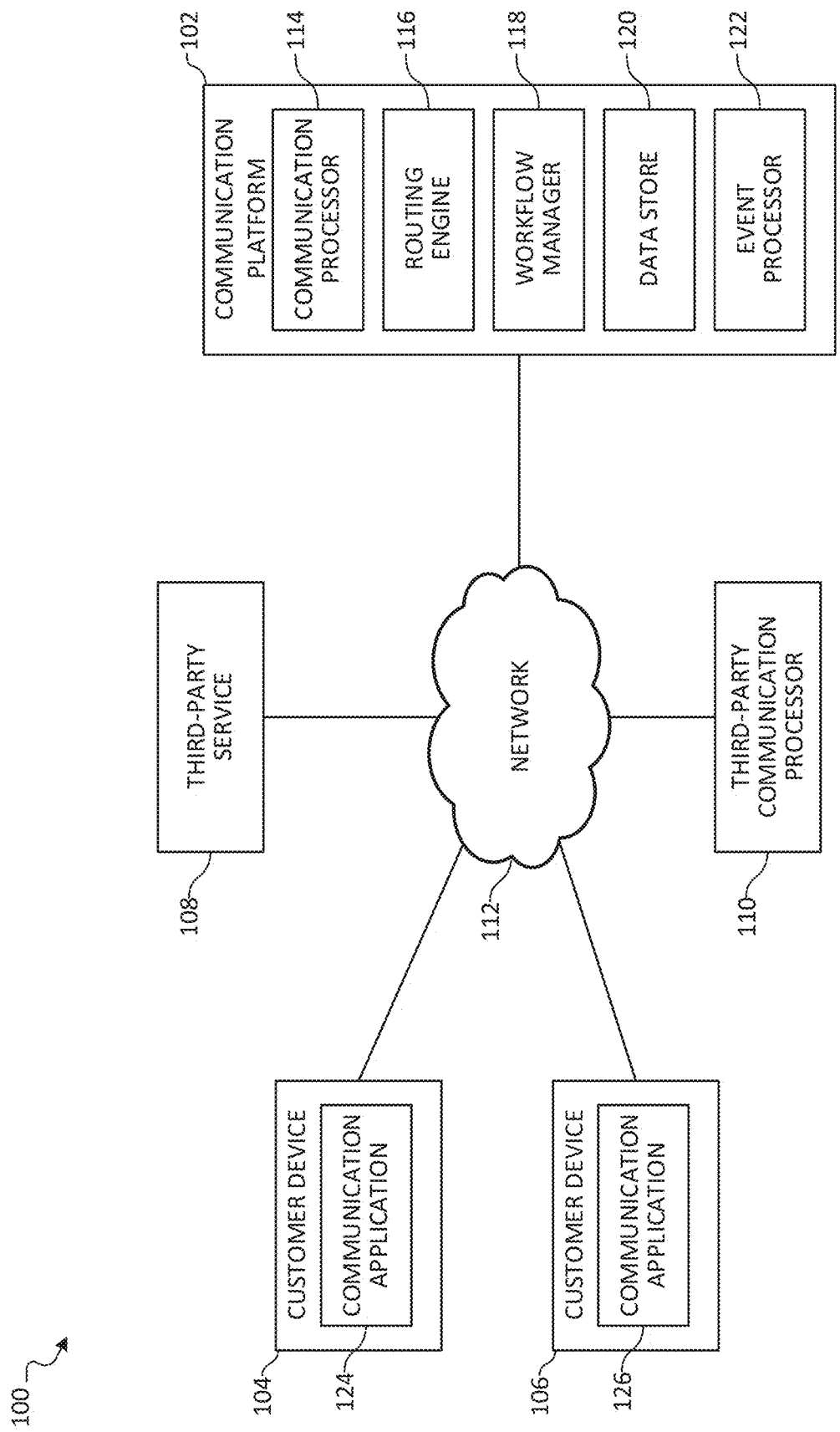
FIG. 1 illustrates an overview of an example system in accordance with the communication router and hub techniques described herein.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

In examples, a communication platform provides communication functionality for one or more services. For example, the communication platform may enable a service to communicate with a customer using any of a variety of communication technologies, including, but not limited to, voice calls (e.g., telephone calls or voice over IP (VoIP) calls), electronic messages (e.g., text messages, email messages, and/or via live chat functionality), and/or video calls. Additionally, the communication platform may route communications between experience agents of the service and customers (e.g., in response to an incoming communication from a customer to an experience agent). For example, the incoming communication may be processed according to a workflow, whereby the customer may ultimately be put in contact with an experience agent accordingly. In some instances, the communication platform itself may be transparent to a customer, such that it appears (at least from the perspective of the customer) that the customer is communicating directly with the service and/or an experience agent associated therewith.

However, in instances where the communication platform is used by multiple services to communicate with the same customer, it may be difficult to process an incoming communication from the customer in a way that maintains such transparency from the perspective of the customer. For example, the customer may use a telephone number to communicate with the communication platform, such that the telephone number is associated with communications to both a first service and a second service. Thus, determining whether the customer intends to communicate with either the first service or the second service such that the incoming communication can be routed appropriately may not be possible based solely on the telephone number.

In addition to such routing issues, it may be difficult to access and utilize information associated with the customer in order to process the incoming communication according to a workflow that is applicable to a context associated with the customer. For example, the customer may have already completed an initial workflow with the first service, such that a subsequent workflow may be applicable for an incoming communication from the customer associated with the first service. By contrast, the customer may have yet to complete an initial workflow for the second service. Absent the techniques described herein, an incorrect workflow may be used to process an incoming communication of the customer, which may cause the customer to have to provide information that has already been provided and/or limit the ability of an experience agent to interact with the customer effectively. These and other limitations may ultimately result in reduced customer satisfaction, unnecessary experience agent frustration, decreased efficiency, and/or increased operational costs, among other detriments.

Thus, aspects of the present application relate to a communication router and hub. In examples, the communication platform utilizes a different communication address when communicating with a customer on behalf of a service. Example addresses include, but are not limited to, a telephone number, an email address, or a username. For example, a first telephone number may be used for a first service, while a second telephone number may be used for a second service. Thus, when an incoming communication is received from a customer, it may be determined that the customer is calling for the first service based at least in part on determining that the incoming communication is associated with the first telephone number. In some instances, the first telephone number may not be exclusive to the first service, such that it may further be determined based on an association between the customer's telephone number and the first telephone number. Thus, the {customer address, service communication address} pairing may be used to perform such a determination.

As a result of determining a service associated with a communication, the communication platform may determine customer information associated with the customer, where at least a part of the customer information is associated with the service (e.g., the first service in the above example). For example, the customer information may comprise information that was previously received by the service (e.g., contact information, billing information, account information, etc.). As another example, the customer information may comprise information generated by or otherwise managed by the service, such as an account status or an application status. The generated customer information may be associated with the incoming communication, thereby providing context. Such context may be used when processing the incoming communication according to a workflow. As another example, the customer information may be provided to an experience agent, thereby enabling the experience agent to assist the customer better.

It will be appreciated that the instant aspects may similarly be applied to outgoing communications. For example, an experience agent may initiate a communication with a customer, such that customer information is similarly generated (e.g., based at least in part on an address associated with the customer). The customer information may be used to determine how to route the communication (e.g., which technology to use or a time of day during which the communication should be transmitted to the customer). In other instances, the customer information may be presented to the experience agent, such that the experience agent may use the customer information to engage with the customer.

As another example, an experience agent may use a computing device to access a ticket tracking system in which customer issues are tracked. As an example, a ticket associated with a customer may be automatically generated or updated as a result of an incoming and/or outgoing communication. Such a ticket may be presented to the experience agent in association with customer information and/or other information associated with the ticket (e.g., a status and/or a log of past activity).

In a further example, a task manager may be used to maintain a list of tasks for the experience agent, at least some of which may have associated customer information. For example, a task for contacting a customer may enable the experience agent to view or otherwise access customer information associated with the customer. In examples, the list of tasks may be automatically prioritized (e.g., according to a task priority, a period of time since the customer was last contacted, and/or based on associated customer information). In some examples, the task manager may enable the experience agent to automatically establish contact with customers, for example by iterating through the tasks and communicating with associated customers accordingly.

In some instances, the routing aspects described herein may be performed with respect to a group of experience agents. As an example, group membership may vary and communications may be routed to a member of the group (e.g., independent of a specific association between the communication and a given experience agent). For example, an experience agent may be selected from the group according to experience level, area of expertise, and/or past experience with an associated customer, among any of a variety of other criteria. In such an example, customer information associated with the communication may comprise historical information associated with past communications, thereby enabling the experience agent in receipt of the communication to have additional context when handling the communication. In some instances, different group types may be used, for example to group experience agents according to associated skills or geographic regions, among other examples. For example, a group may be associated with a service communication address, a workflow, and/or a customer record, among other examples.

It will be appreciated that customer information (which may be stored as a customer record) may be associated with any number of customer addresses and/or service communication addresses. For example, a customer may use multiple communication techniques, such that the same customer record may be associated with one or more communication addresses for each communication technique. As an example, a customer telephone number and a customer email address may each be associated with a customer record. As another example, the same customer may communicate with multiple services that are related, such that a customer record may be shared with each of the multiple services. Thus, a customer record need not be associated with a single customer, service, customer address, and/or service communication address.

In some instances, a communication platform according to aspects of the present disclosure may generate one or more events based at least in part on a communication. For example, the communication platform may generate an event when an incoming or outgoing communication occurs, based on a customer progressing through a workflow, and/or in response to information associated with a customer being updated (e.g., new or updated information is received from a customer or a service). Accordingly, any of a variety of processing may be performed in response to such events. For example, a notification may be provided to a computing device of a customer or, as another example, a service may receive such an event and may provide an indication to an experience agent to contact a customer associated therewith. In some instances, an event may cause a customer to progress within a workflow.

Returning to the above examples, an indication of a generated event may be received by a ticket tracking system and/or a task manager, thereby enabling the functionality discussed above. For example, the ticket tracking system may generate a new ticket or update or remove an existing ticket. As another example, the task manager may generate a new task or update or remove an existing task. Similarly, the ticket tracking system or task manager may generate events that are processed according to aspects described herein (e.g., by the communication platform). Thus, it will be appreciated that any of a variety of techniques may be used to coordinate operations across the systems and platforms described herein, including, but not limited to, direct communication (e.g., via one or more application programming interfaces (APIs), webhooks, or sockets) or indirect communication (e.g., via an event bus or centralized data store).

FIG. 1 illustrates an overview of an example system 100 for the communication router and hub techniques described herein. As illustrated, system 100 comprises communication platform 102, customer device 104, customer device 106, third-party service 108, third-party communication processor 110, and network 112. In examples, communication platform 102, customer device 104, customer device 106, third-party service 108, and third-party communication processor 110 communicate via network 112. For example, network 112 may comprise a local area network, a wireless network, or the Internet, or any combination thereof, among other examples.

Communication platform 102, customer device 104, customer device 106, third-party service 108, and third-party communication processor may each be any of a variety of computing devices. For example, communication platform 102, third-party service 108, and/or third-party communication processor 110 may each be a distributed computing device comprised of a set of computing devices that provide the functionality described herein. As another example, customer device 104 and customer device 106 may each be a mobile computing device, a laptop computing device, a tablet computing device, and/or a desktop computing device, among other examples.

It will be appreciated that while system 100 is illustrated as comprising one communication platform 102, one third-party service 108, one third-party communication processor 110, and two customer devices 104 and 106, any number of such elements may be used in other examples. Further, the functionality described herein may be distributed among or otherwise implemented on any number of different computing devices in any of a variety of other configurations in other examples.

Communication platform 102 is illustrated as comprising communication processor 114, routing engine 116, workflow manager 118, data store 120, and event processor 122. As described above, communication platform 102 enables experience agents associated with third-party service 108 to communicate with customers (e.g., which may each be a user of customer device 104 or customer device 106) and vice versa. Third-party service 108 may be any of a variety of services, including, but not limited to, a subscription service provider, a retailer, a bank, or a mortgage provider.

Thus, communication processor 114 may receive incoming communications, generate outgoing communications, and/or manage ongoing communications between experience agents and customers. In some instances, communication processor 114 utilizes third-party communication processor 110 for at least a part of the communication functionality provided by communication platform 102. For example, third-party communication processor 110 may provide an API, event bus, or other mechanism by which communication processor 114 may integrate communication functionality provided by third-party communication processor 110. As an example, third-party communication processor 110 may enable communication processor 114 to send and receive text messages and/or telephone calls, among other examples.

Communication platform 102 is further illustrated as comprising routing engine 116. Routing engine 116 may route communications according to aspects described herein (e.g., as may be processed by communication processor 114 and/or third-party communication processor 110). For example, routing engine 116 may evaluate a customer address and/or a service communication address associated with a communication to determine a service with which the communication is associated (e.g., third-party service 108). In examples, an association between a {customer address, service communication address} pair and a service may be stored in data store 120. Accordingly, routing engine 116 generates customer information associated with the communication. For example, data store 120 may further store contact information, billing information, account information, and/or information from third-party service 108 associated with the customer, which may be included as part of the generated customer information.

Customer information generated by routing engine 116 may be associated with the communication, such that it is usable by workflow manager 118 when processing the communication. As another example, at least a part of the communication information may be presented to an experience agent (e.g., of third-party service 108), thereby enabling the experience agent to better serve the customer.

Workflow manager 118 processes communications according to one or more workflows, as may be determined by routing engine 116 and/or stored by data store 120. In examples, third-party service 108 may specify a workflow stored by data store 120 or, as another example, communication platform 102 may provide a set of pre-existing workflows that may be used by a service accordingly. Thus, when routing engine 116 determines that a communication is associated with third-party service 108, a workflow associated with third-party service 108 may be identified within data store 120 and used to handle the communication accordingly.

As used herein, a workflow comprises a set of steps that are performed as part of a communication session with a customer. The workflow may comprise one or more rules and/or branching logic, such that different actions may be performed as part of the workflow, based at least in part on information received from the customer, customer information generated by routing engine 116, and/or any of a variety of other conditions. Thus, in some instances, a customer communication may be handled entirely according to a workflow. In other instances, the workflow may ultimately cause the communication to be routed to an experience agent of third-party service 108.

Communication platform 102 is further illustrated as comprising event processor 122, which may generate one or more events based at least in part on a communication. For example, event processor 122 may generate an event when an incoming or outgoing communication occurs (e.g., as may be indicated by communication processor 114), based on a customer progressing through a workflow (e.g., as may be indicated by workflow manager 118), and/or in response to information associated with a customer being updated (e.g., as may be stored by data store 120). Accordingly, any of a variety of processing may be performed in response to such events. For example, a notification may be provided to customer device 104 or 106 of a customer or, as another example, third-party service 108 may receive such an event and may provide an indication to an experience agent to contact a customer associated therewith. In some instances, an event generated by event processor 122 may be received by workflow manager 118, thereby causing a customer to progress within a workflow.

Customer device 104 and customer device 106 are each illustrated as comprising communication application 124 and communication application 126, respectively. As noted above, customer devices 104 and 106 may each enable a customer to communicate via communication platform 102 using any of a variety of communication technologies. Thus, communication applications 124 and 126 may each implement such communication technologies. For example, communication application 124 may be a VoIP phone application, while communication application 126 may be an electronic messaging application. As another example, communication application 124 and/or 126 may be a web browser accessing live chat functionality of a web page.

Figure 2:
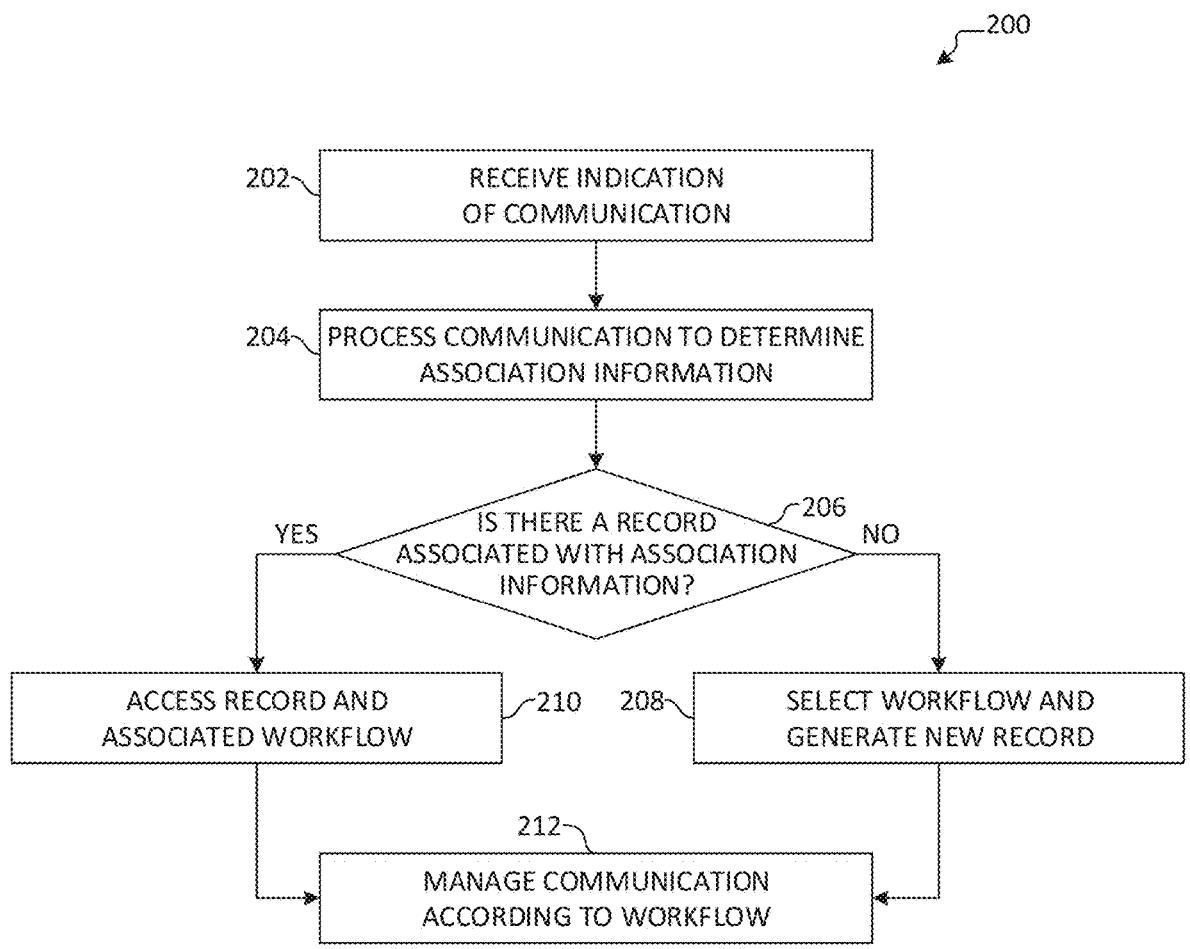
FIG. 2 illustrates an overview of an example method for processing a communication according to a workflow based at least in part on a customer record.

FIG. 2 illustrates an overview of an example method 200 for processing a communication according to a workflow based at least in part on a customer record. In examples, aspects of method 200 are performed by a communication platform, such as communication platform 102 in FIG. 1. For example, a communication processor, such as communication processor 114 may perform such aspects.

Method 200 begins at operation 202, where an indication of a communication is received. For example, the indication may be associated with a communication from a customer device, such as customer device 104 or 106 in FIG. 1 (e.g., as may be generated by a communication processor, such as communication processor 114). In another example, the indication may be received from a third-party communication processor, such as third-party communication processor 110 in FIG. 1.

Flow progresses to operation 204, where the communication is processed to generate association information. In examples, the indication received at operation 202 comprises a customer address and/or a service communication address, such that the association information generated at operation 204 comprises a {customer address, service communication address} pair. For example, the indication may comprise a telephone number associated with the customer (e.g., from which the customer is calling) and/or a telephone number associated with a service (e.g., a number to which the communication is directed). As another example, the indication may comprise a customer email address and/or a service email address (or at least a subpart thereof, such as a domain). It will be appreciated that any of a variety of other information may be used as an alternative or in addition to the customer address and/or service communication address. For example, a geographical location or region may be determined for the customer or, as another example, referrer information or other information associated with a website (e.g., as may be determined in the case of live chat functionality). Additionally, a customer record may have multiple addresses associated therewith, as discussed above.

At determination 206, it is determined whether there is a customer record associated with the association information. For example, the customer record may be stored in a data store, such as data store 120 in FIG. 1. In some instances, determination 206 comprises accessing a data store or portion of a data store (e.g., a table or a subgraph) associated with a service (e.g., as may be determined based on the association information generated at operation 204).

If, at determination 206, it is determined that there is a customer record associated with the association information, flow branches "YES" to operation 210, where the customer record and an associated workflow is accessed. As described above, the communication may be managed according to a workflow based at least in part on the customer record. For example, the workflow may be determined according to one or more rules, which may process information stored by or otherwise associated with the customer record. As another example, the workflow accessed at operation 210 may be determined independently of the customer record, as may be the case when incoming communications are processed the same regardless of whether an associated customer record is available.

Flow progresses to operation 212, where the communication is managed according to the workflow. For example, the communication may be placed in a queue until the next available experience agent is available to assist the customer. As another example, the communication may be placed in a queue for a specific experience agent, as may be determined from the customer record. As described above, the customer record may be associated with the communication, such that an experience agent may be presented with or may otherwise access information associated with the customer. Flow terminates at operation 212.

If, however, it is instead determined at determination 206 that there is not an associated customer record, flow instead branches "NO" to operation 208, where a workflow is selected and a customer record is generated. For example, a default workflow may be specified by a service or, as another example, a workflow may be selected according to one or more rules. For example, a geographical location associated with the customer may be used to determine a branch or set of experience agents that are available to communicate with the customer. The generated customer record and the customer information associated therewith may comprise information associated with the customer information, such as the customer address and/or service communication address associated with the communication. Thus, the customer record may be retrievable in the future for subsequent communications between the service and the customer (e.g., as discussed above with respect to operation 210). Flow progresses to operation 212, where the communication is managed according to the workflow, which was described above. Flow terminates at operation 212.

Figure 3A:
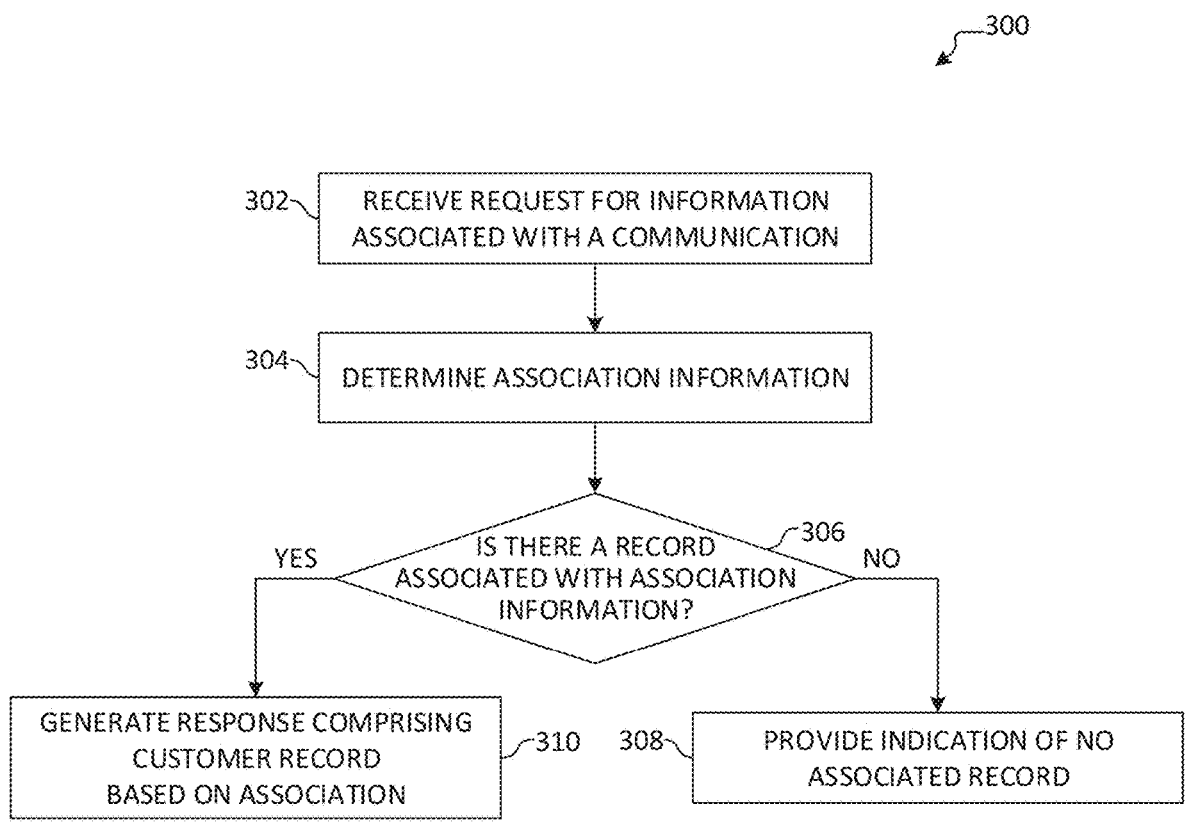
FIG. 3A illustrates an overview of an example method for generating communication information for a communication.

FIG. 3A illustrates an overview of an example method 300 for generating communication information for a communication. In examples, aspects of method 300 are performed by a communication platform, such as communication platform 102 in FIG. 1. For example, method 300 may be performed to provide a customer record to an experience agent, thereby providing information to the experience agent to use when handling a communication from a customer.

Method 300 begins at operation 302, where a request for information associated with a communication is received. For example, the request may be received from a computing device of an experience agent in response to an incoming communication, according to aspects described herein. As another example, the request may be received in response to the experience agent initiating a communication with a customer or in preparation for initiating the communication, among other examples. The request may comprise a customer address and/or service communication address. As another example, the request may comprise the customer address and an indication as to the service associated with the communication platform.

Flow progresses to operation 304, where association information is determined. For example, the association information may be determined based at least in part on information received as part of the request in operation 302. As another example, information may be requested or otherwise accessed from a communication processor, such as communication processor 114 and/or third-party communication processor 110 in FIG. 1. As discussed above, the association information generated at operation 304 may comprise a {customer address, service communication address} pair, such as telephone numbers and/or email addresses. It will be appreciated that any of a variety of other information may be used as an alternative or in addition to the customer address and/or service communication address. For example, a geographical location or region may be determined for the customer or, as another example, referrer information or other information associated with a website (e.g., as may be determined in the case of live chat functionality) may be used.

Flow progresses to determination 306, where it is determined whether there is a customer record associated with the association information. For example, the customer record may be stored in a data store, such as data store 120 in FIG. 1. In some instances, determination 306 comprises accessing a data store or portion of a data store (e.g., a table or a subgraph) associated with a service (e.g., as may be determined based on the association information generated at operation 304).

If, at determination 306, it is determined that there is a customer record associated with the association information, flow branches "YES" to operation 310, where a response comprising at least a part of the customer record (or a reference thereto) is generated. For example, the customer record may comprise customer information stored by the data store. As discussed above, the customer record may comprise information received from a customer and/or generated by a service, among other examples. In some instances, the customer record comprises information that was provided by the customer as a result of navigating through a workflow (e.g., during the current communication session). Flow terminates at operation 310.

If, however, it is instead determined at determination 306 that there is not a customer record, flow instead branches "NO" to operation 308, where an indication is provided that there is no associated customer record. In some instances, the indication comprises an empty customer record or comprises a reference to a new customer record that was created in a data store (e.g., as discussed above with respect to operation 208 in FIG. 2). Flow terminates at operation 208.

Figure 3B:
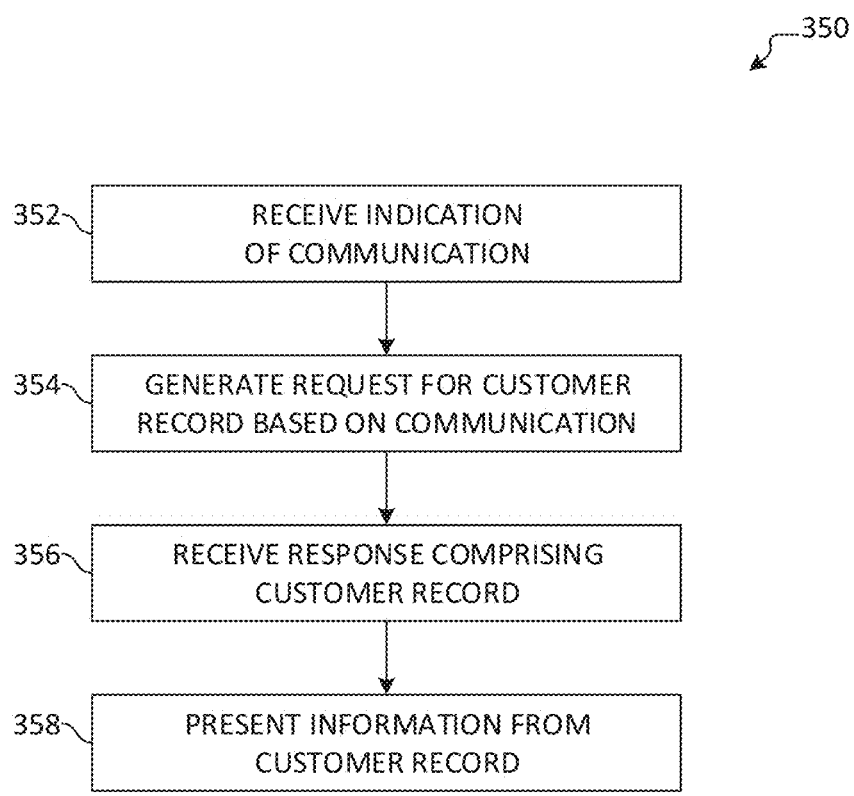
FIG. 3B illustrates an overview of an example method for generating a display of communication information associated with a communication.

FIG. 3B illustrates an overview of an example method 350 for generating a display of communication information associated with a communication. In examples, aspects of method 350 may be performed by a computing device of an experience agent associated with a service when handling a communication from a customer. For example, method 350 may be performed when a communication is directed to an experience agent by a workflow manager, such as workflow manager 118 in FIG. 1. As another example, aspects of method 350 may be performed when an experience agent initiates a communication with a customer.

Method 350 begins at operation 352, where an indication of a communication is received. For example, the indication may be received from a communication processor, such as communication processor 114 in FIG. 1. As discussed above, the indication may be received as a result of a workflow manager (e.g., workflow manager 118 in FIG. 1) processing a communication according to a workflow.

Flow progresses to operation 354, where a request for a customer record is generated based on the communication. For example, the indication may comprise a customer address and/or a service communication address, which may be used to generate the request for the customer record. In examples, the indication received at operation 352 comprises association information that is provided as part of the request at operation 354.

At operation 356, a response is received that comprises a customer record associated with the communication. As an example, the received customer record may have been accessed from a data store (e.g., similar to aspects of operation 210 in FIG. 2 and/or operation 310 in FIG. 3A) based on association information that was provided as part of the request in operation 354. As another example, the customer record may have been generated according to aspects similar to those of operation 208 in FIG. 2 and/or operation 308 in FIG. 3A.

Moving to operation 358, information from the received customer record is presented. For example, the information may be presented as part of an incoming communication screen, as may be displayed when an experience agent is presented with the option to answer a telephone call or when an experience agent is presented with a new electronic message. As another example, the information may be presented in a form that enables the customer experience agent to browse the customer record (e.g., during the communication session or when preparing a response to the communication). Thus, it will be appreciated that information from the customer record may be presented according to any of a variety of techniques. Flow terminates at operation 358.

FIGS. 4A-4D illustrate overviews of example user interface aspects for a communication router and hub according to aspects described herein. For example, such user interface aspects may be generated by a computing device for an experience agent, as described above.

Figures 4A, 4B, 4C:
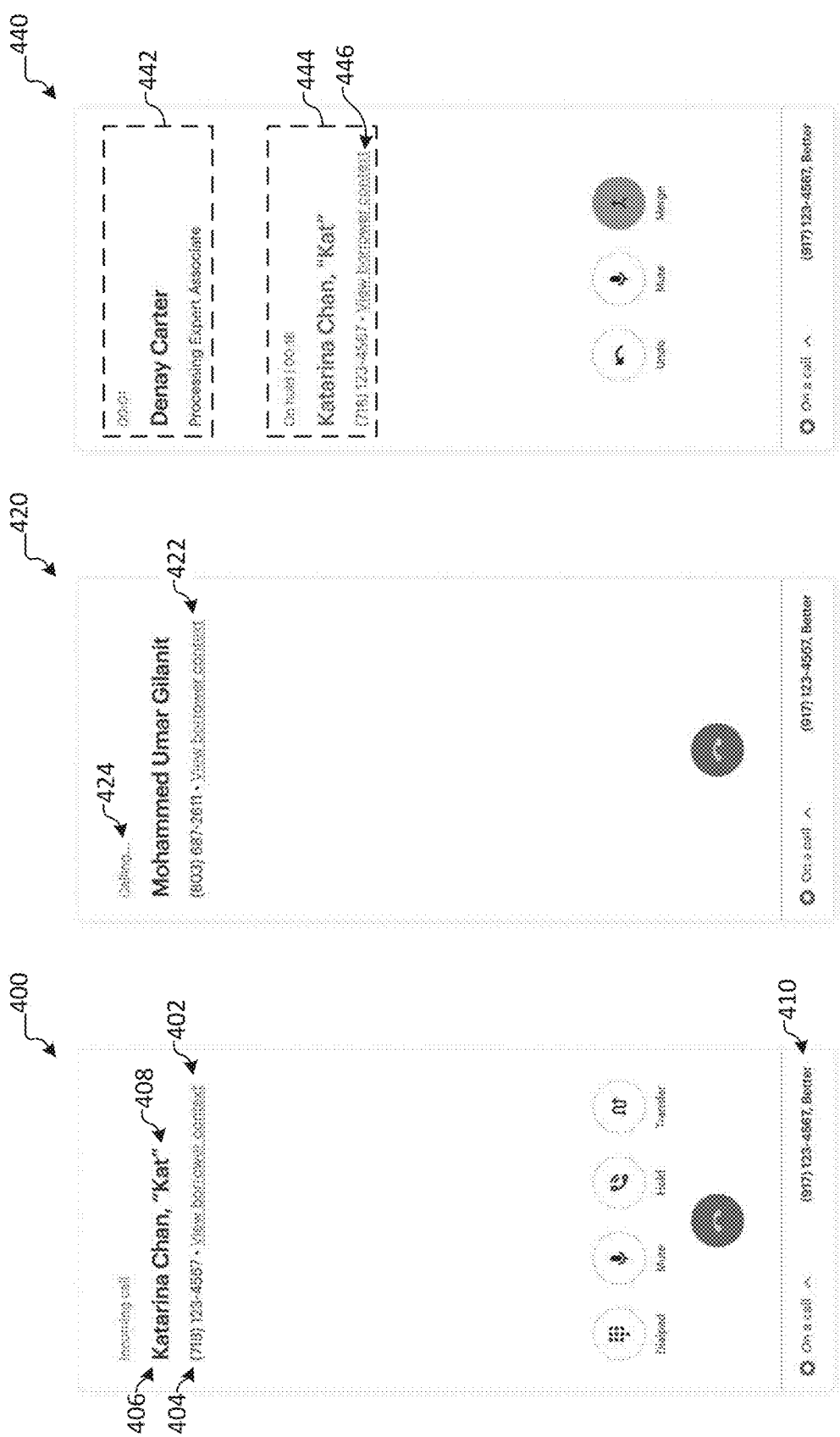
FIGS. 4A-4D illustrate overviews of example user interface aspects for a communication router and hub according to aspects described herein.

FIG. 4A illustrates an example incoming communication screen 400. As illustrated, incoming communication screen 400 comprises link 402, labeled "view borrow context." Accordingly, a user actuation of link 402 may cause information from a customer record to be displayed according to aspects described herein. Incoming communication screen 400 further comprises customer address 404 ("(718) 123-4567"), customer name 406 ("Katarina Chan"), and customer nickname 408 ("Kat"). Such aspects may similarly be populated from a customer record or, as another example, at least a part of such information may be received or otherwise determined in association with the incoming communication (e.g., via a caller identification service or an address book/contact list). Service communication address 410 is also presented ("(917) 123-4567"). As illustrated, service communication address 410 further comprises a friendly name ("Better"), thereby providing an indication as to the service with which the communication is associated.

FIG. 4B illustrates an example outgoing communication screen 420. Outgoing communication screen 420 comprises certain similar aspects as were discussed above with respect to FIG. 4A and are therefore not necessarily re-described below in detail. As illustrated, outgoing communication screen 420 comprises link 422, labeled "view borrow context." Accordingly, a user actuation of link 422 may cause information from a customer record to be displayed according to aspects described herein, such that customer information may be accessed when initiating a communication. Outgoing communication screen 420 further comprises indicator 424 ("Calling . . . "), which provides an indication that a communication is being initiated. By contrast, incoming communication screen 400 instead indicates that the communication is incoming.

FIG. 4C illustrates an example ongoing communication screen 440. As illustrated, multiple communication sessions 442 and 444 are active. Communication session 442 is an internal communication (e.g., with "Denay Carter," who is a "Processing Expert Associate"), while communication session 444 is with a customer that is external to the service (e.g., with "Katarina Chan"). Accordingly, communication session 444 is further illustrated with link 446 to access customer information associated with Katarina Chan. Thus, it will be appreciated that customer information may be selectively presented according to aspects disclosed herein.

Figure 4D:
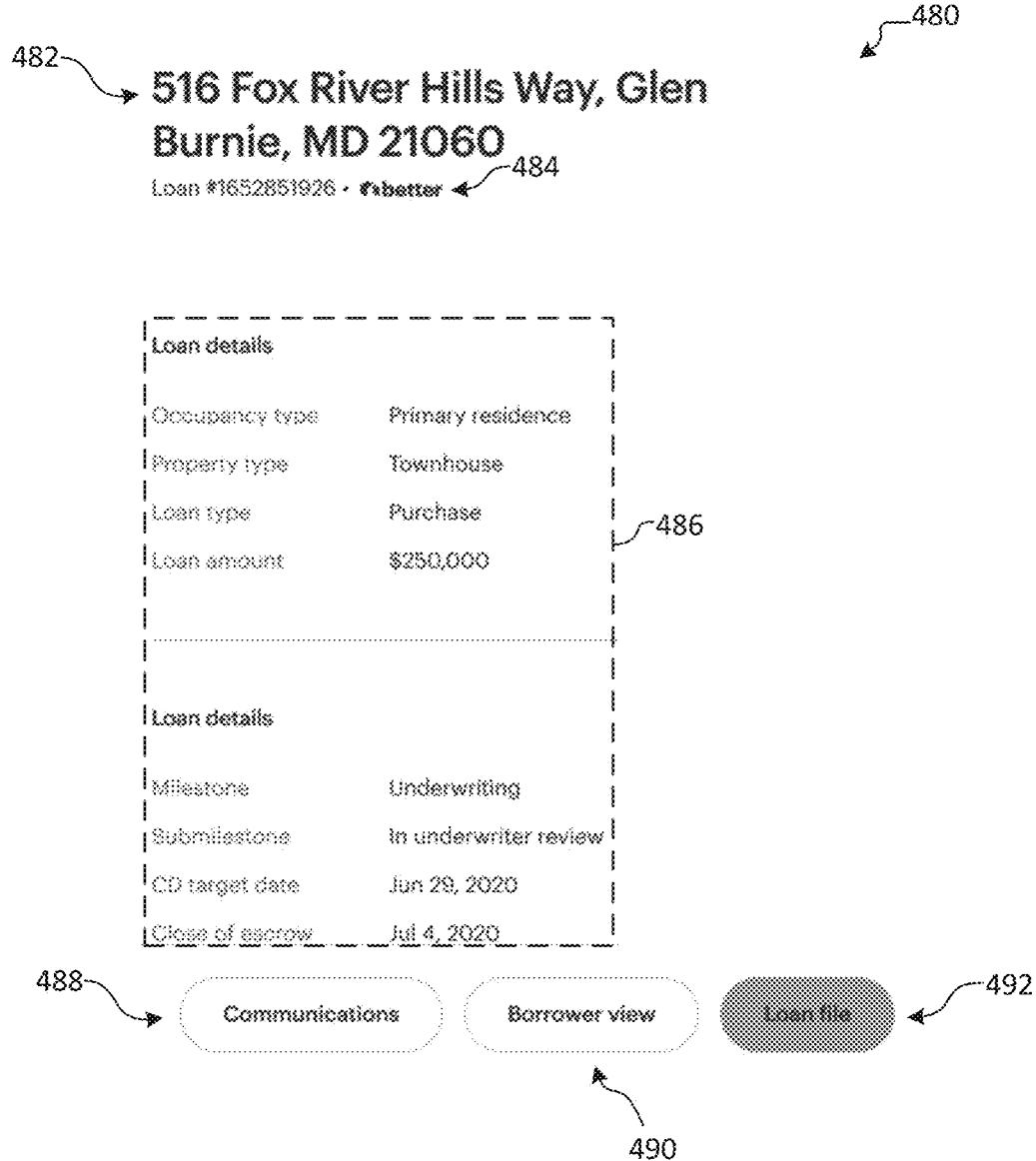

FIG. 4D illustrates an overview of an example customer record 480. As illustrated, customer record 480 comprises location information 482 associated with the customer, service icon 484 indicating the service with which the customer is associated, as well as service-specific information 486. Thus, it will be appreciated that a service may specify any of a variety of information to be stored as part of a customer record. Customer record 480 further comprises buttons 488, 490, and 492, each of which may cause additional information to be displayed or an action associated with the customer to be performed, among other examples. For instance, button 488 may display a communication history associated with the customer, while button 490 and 492 may each present additional customer information (e.g., as may be received from the customer and/or generated by the service).

Figure 5:
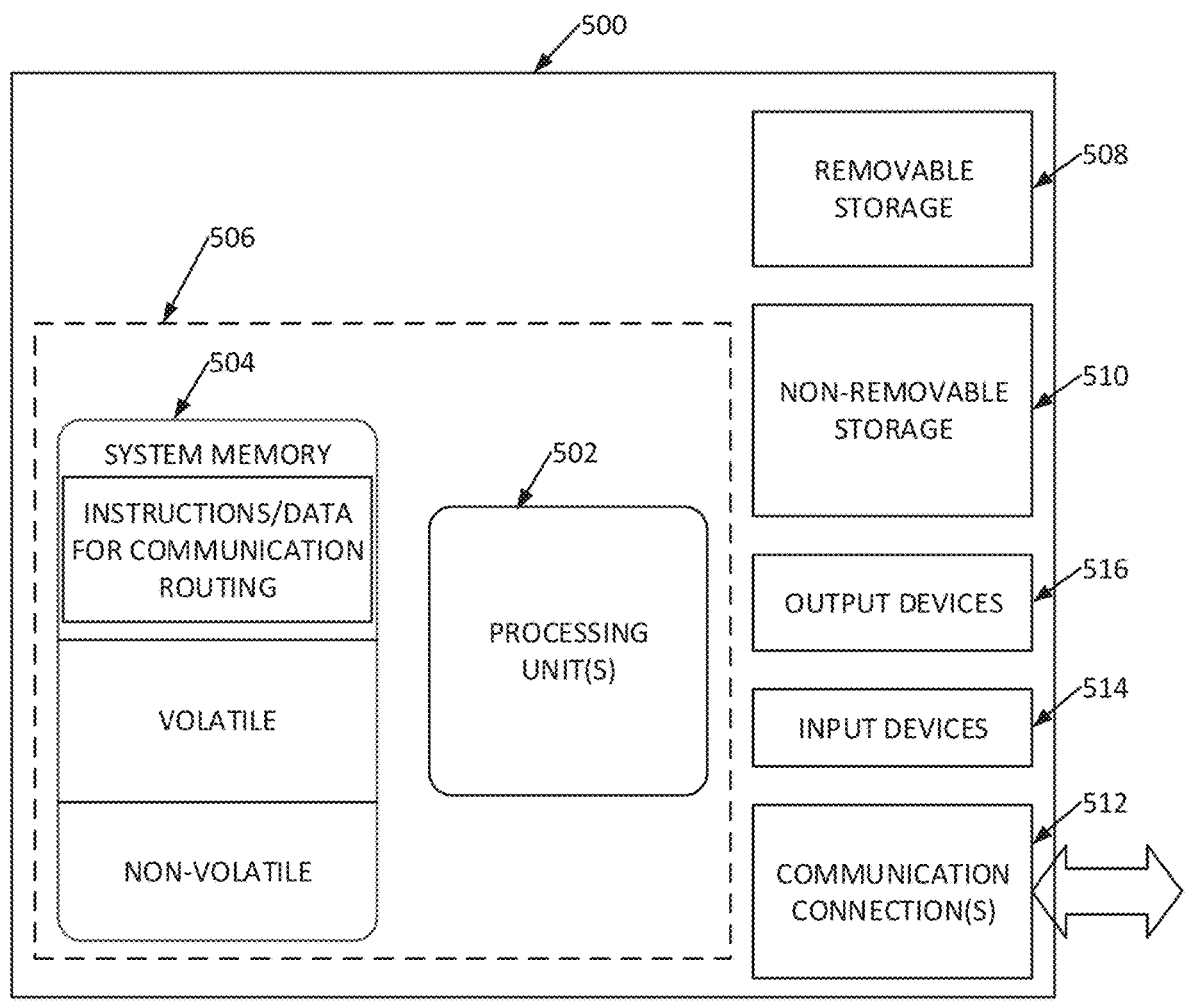
FIG. 5 illustrates an example of a suitable operating environment in which one or more aspects of the present application may be implemented.

FIG. 5 illustrates an example of a suitable operating environment 500 in which one or more of the present embodiments may be implemented. This is only one example of a suitable operating environment and is not intended to suggest any limitation as to the scope of use or functionality. Other well-known computing systems, environments, and/or configurations that may be suitable for use include, but are not limited to, personal computers, server computers, hand-held or laptop devices, multiprocessor systems, microprocessor-based systems, programmable consumer electronics such as smart phones, network PCs, minicomputers, mainframe computers, distributed computing environments that include any of the above systems or devices, and the like.

In its most basic configuration, operating environment 500 typically may include at least one processing unit 502 and memory 504. Depending on the exact configuration and type of computing device, memory 504 (storing, among other things, APIs, programs, etc. and/or other components or instructions to implement or perform the system and methods disclosed herein, etc.) may be volatile (such as RAM), non-volatile (such as ROM, flash memory, etc.), or some combination of the two. This most basic configuration is illustrated in FIG. 5 by dashed line 506. Further, environment 500 may also include storage devices (removable, 508, and/or non-removable, 510) including, but not limited to, magnetic or optical disks or tape. Similarly, environment 500 may also have input device(s) 514 such as a keyboard, mouse, pen, voice input, etc. and/or output device(s) 516 such as a display, speakers, printer, etc. Also included in the environment may be one or more communication connections, 512, such as LAN, WAN, point to point, etc.

Operating environment 500 may include at least some form of computer readable media. The computer readable media may be any available media that can be accessed by processing unit 502 or other devices comprising the operating environment. For example, the computer readable media may include computer storage media and communication media. The computer storage media may include volatile and nonvolatile, removable and non-removable media implemented in any method or technology for storage of information such as computer readable instructions, data structures, program modules or other data. The computer storage media may include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium, which can be used to store the desired information. The computer storage media may not include communication media.

The communication media may embody computer readable instructions, data structures, program modules, or other data in a modulated data signal such as a carrier wave or other transport mechanism and includes any information delivery media. The term "modulated data signal" may mean a signal that has one or more of its characteristics set or changed in such a manner as to encode information in the signal. For example, the communication media may include a wired media such as a wired network or direct-wired connection, and wireless media such as acoustic, RF, infrared and other wireless media. Combinations of the any of the above should also be included within the scope of computer readable media.

The operating environment 500 may be a single computer operating in a networked environment using logical connections to one or more remote computers. The remote computer may be a personal computer, a server, a router, a network PC, a peer device or other common network node, and typically includes many or all of the elements described above as well as others not so mentioned. The logical connections may include any method supported by available communications media. Such networking environments are commonplace in offices, enterprise-wide computer networks, intranets and the Internet.

The different aspects described herein may be employed using software, hardware, or a combination of software and hardware to implement and perform the systems and methods disclosed herein. Although specific devices have been recited throughout the disclosure as performing specific functions, one skilled in the art will appreciate that these devices are provided for illustrative purposes, and other devices may be employed to perform the functionality disclosed herein without departing from the scope of the disclosure.

As stated above, a number of program modules and data files may be stored in the system memory 504. While executing on the processing unit 502, program modules (e.g., applications, Input/Output (I/O) management, and other utilities) may perform processes including, but not limited to, one or more of the stages of the operational methods described herein such as the methods illustrated in FIG. 2, 3A, or 3B, for example.

Furthermore, examples of the invention may be practiced in an electrical circuit comprising discrete electronic elements, packaged or integrated electronic chips containing logic gates, a circuit utilizing a microprocessor, or on a single chip containing electronic elements or microprocessors. For example, examples of the invention may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality described herein may be operated via application-specific logic integrated with other components of the operating environment 500 on the single integrated circuit (chip). Examples of the present disclosure may also be practiced using other technologies capable of performing logical operations such as, for example, AND, OR, and NOT, including but not limited to mechanical, optical, fluidic, and quantum technologies. In addition, examples of the invention may be practiced within a general purpose computer or in any other circuits or systems.

As will be understood from the foregoing disclosure, one aspect of the technology relates to a system comprising: at least one processor; and memory storing instructions that, when executed by the at least one processor, causes the system to perform a set of operations. The set of operations comprises: receiving an indication of an incoming communication, wherein the incoming communication is associated with a customer; generating, for the incoming communication, association information comprising at least a customer address and a service communication address; determining, based at least in part on the association information, whether there is a customer record associated with the customer; and when it is determined that there is a customer record associated with the customer, providing customer information from the customer record in association with the incoming communication. In an example, the set of operations further comprises: when it is determined that there is a customer record associated with the customer, determining a workflow for routing the call based at least in part on the customer record; and processing the incoming communication according to the determined workflow. In another example, processing the incoming communication according to the determined workflow comprises selecting an experience agent from a group of experience agents. In a further example, the group of experience agents is identified based on an association with at least one of the service communication address, the workflow, or the customer record. In yet another example, the incoming communication is a first communication; the service communication address is a first service communication address associated with a first service; and the set of operations further comprises: receiving an indication of a second communication, wherein the second communication is associated with the customer and a second service; determining, based at least in part on the association with the second service, that there is not a customer record associated with the second communication; generating a new customer record associated with the customer and the second service; and processing the second communication according to a default workflow of the second service. In a further still example, the first service is different from the second service. In another example, the set of operations further comprises generating an event for the incoming communication that comprises at least a part of the customer information.

In another aspect, the technology relates to a method for processing an incoming communication. The method comprises: receiving an indication of an incoming communication associated with a customer; providing, to a communication platform, a request for customer information; receiving, from the communication platform in response to the request, the customer information; and generating a display of at least a part of the received customer information. In an example, the request for customer information comprises an indication of a communication address associated with the customer. In another example, the request for customer information comprises an indication of a service associated with the incoming communication. In a further example, the display comprises a user interface element and the method further comprises: in response to receiving an actuation of the user interface element, updating the display to comprise additional customer information associated with the customer. In yet another example, the method further comprises: receiving user input comprising updated customer information; and generating a request to update the customer information based on the updated customer information. In a further still example, the received customer information comprises an indication of a service associated with the incoming communication; and the display of the at least a part of the received customer information includes the indication of the service.

In a further aspect, the technology relates to a method for processing an incoming communication. The method comprises: receiving an indication of the incoming communication, wherein the incoming communication is associated with a customer; generating, for the incoming communication, association information comprising at least a customer address and a service communication address; determining, based at least in part on the association information, whether there is a customer record associated with the customer; and when it is determined that there is a customer record associated with the customer, providing customer information from the customer record in association with the incoming communication. In an example, the method further comprises: when it is determined that there is a customer record associated with the customer, determining a workflow for routing the call based at least in part on the customer record; and processing the incoming communication according to the determined workflow. In another example, processing the incoming communication according to the determined workflow comprises selecting an experience agent from a group of experience agents. In a further example, the group of experience agents is identified based on an association with at least one of the service communication address, the workflow, or the customer record. In yet another example, the incoming communication is a first communication; the service communication address is a first service communication address associated with a first service; and the method further comprises: receiving an indication of a second communication, wherein the second communication is associated with the customer and a second service; determining, based at least in part on the association with the second service, that there is not a customer record associated with the second communication; generating a new customer record associated with the customer and the second service; and processing the second communication according to a default workflow of the second service. In a further still example, the first service is different from the second service. In another example, the method further comprises generating an event for the incoming communication that comprises at least a part of the customer information.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:
   at least one processor; and
   memory storing instructions that, when executed by the at least one processor, causes the system to perform a set of operations, the set of operations comprising:
      receiving an indication of an incoming communication, wherein the incoming communication is associated with a customer;
      generating, for the incoming communication, association information comprising at least a customer address and a service communication address;
      determining, based at least in part on the association information, whether there is a customer record associated with the customer; and
      when it is determined that there is a customer record associated with the customer, providing customer information from the customer record in association with the incoming communication.

2. The system of claim 1, wherein the set of operations further comprises:
   when it is determined that there is a customer record associated with the customer, determining a workflow for routing the call based at least in part on the customer record; and
   processing the incoming communication according to the determined workflow.

3. The system of claim 2, wherein processing the incoming communication according to the determined workflow comprises selecting an experience agent from a group of experience agents.

4. The system of claim 3, wherein the group of experience agents is identified based on an association with at least one of the service communication address, the workflow, or the customer record.

5. The system of claim 1, wherein:
   the incoming communication is a first communication;
   the service communication address is a first service communication address associated with a first service; and
   the set of operations further comprises:
      receiving an indication of a second communication, wherein the second communication is associated with the customer and a second service;
      determining, based at least in part on the association with the second service, that there is not a customer record associated with the second communication;
      generating a new customer record associated with the customer and the second service; and
      processing the second communication according to a default workflow of the second service.

6. The system of claim 5, wherein the first service is different from the second service.

7. The system of claim 1, wherein the set of operations further comprises generating an event for the incoming communication that comprises at least a part of the customer information.

8. A method for processing an incoming communication, comprising:
   receiving an indication of an incoming communication associated with a customer;
   providing, to a communication platform, a request for customer information;
   receiving, from the communication platform in response to the request, the customer information; and
   generating a display of at least a part of the received customer information.

9. The method of claim 8, wherein the request for customer information comprises an indication of a communication address associated with the customer.

10. The method of claim 9, wherein the request for customer information comprises an indication of a service associated with the incoming communication.

11. The method of claim 8, wherein the display comprises a user interface element and the method further comprises:
   in response to receiving an actuation of the user interface element, updating the display to comprise additional customer information associated with the customer.

12. The method of claim 8, further comprising:
   receiving user input comprising updated customer information; and
   generating a request to update the customer information based on the updated customer information.

13. The method of claim 8, wherein:
   the received customer information comprises an indication of a service associated with the incoming communication; and
   the display of the at least a part of the received customer information includes the indication of the service.

14. A method for processing an incoming communication, the method comprising:
   receiving an indication of the incoming communication, wherein the incoming communication is associated with a customer;
   generating, for the incoming communication, association information comprising at least a customer address and a service communication address;
   determining, based at least in part on the association information, whether there is a customer record associated with the customer; and
   when it is determined that there is a customer record associated with the customer, providing customer information from the customer record in association with the incoming communication.

15. The method of claim 14, further comprising:
   when it is determined that there is a customer record associated with the customer, determining a workflow for routing the call based at least in part on the customer record; and
   processing the incoming communication according to the determined workflow.

16. The method of claim 15, wherein processing the incoming communication according to the determined workflow comprises selecting an experience agent from a group of experience agents.

17. The method of claim 16, wherein the group of experience agents is identified based on an association with at least one of the service communication address, the workflow, or the customer record.

18. The method of claim 14, wherein:
the incoming communication is a first communication;
the service communication address is a first service communication address associated with a first service; and
the method further comprises:
    receiving an indication of a second communication, wherein the second communication is associated with the customer and a second service;
    determining, based at least in part on the association with the second service, that there is not a customer record associated with the second communication;
    generating a new customer record associated with the customer and the second service; and
    processing the second communication according to a default workflow of the second service.

19. The method of claim 18, wherein the first service is different from the second service.

20. The method of claim 14, further comprising generating an event for the incoming communication that comprises at least a part of the customer information.

\* \* \* \* \*